(12) United States Patent
Kalthoff et al.

(10) Patent No.: US 8,499,036 B2
(45) Date of Patent: Jul. 30, 2013

(54) COLLABORATIVE DESIGN PROCESS

(75) Inventors: Wolfgang Kalthoff, Bad Schonborn (DE); Guenter Huber, Oberkirch (DE); Guido Hoeckele, Knittlingen (DE); Thomas Vogt, Roemerberg (DE); Beate Koch, Leinfelden-Echterdingen (DE)

(73) Assignee: SAP AG, Walldorf (DE)

( * ) Notice: Subject to any disclaimer, the term of this patent is extended or adjusted under 35 U.S.C. 154(b) by 2328 days.

(21) Appl. No.: 10/622,360

(22) Filed: Jul. 17, 2003

(65) Prior Publication Data

US 2005/0091179 A1 Apr. 28, 2005

Related U.S. Application Data

(63) Continuation-in-part of application No. 10/306,718, filed on Nov. 27, 2002, now abandoned.

(60) Provisional application No. 60/367,397, filed on Mar. 21, 2002.

(51) Int. Cl.
*G06F 15/16* (2006.01)

(52) U.S. Cl.
USPC .................................. 709/204; 726/27

(58) Field of Classification Search
USPC ............................... 709/204; 726/27
See application file for complete search history.

(56) References Cited

U.S. PATENT DOCUMENTS

| | | | |
|---|---|---|---|
| 4,459,663 A | 7/1984 | Dye | |
| 5,099,431 A | 3/1992 | Natarajan | |
| 5,182,705 A | 1/1993 | Barr et al. | |
| 5,191,534 A | 3/1993 | Orr et al. | |
| 5,311,424 A | 5/1994 | Mukherjee et al. | |
| 5,335,346 A * | 8/1994 | Fabbio | 711/163 |
| 5,418,945 A * | 5/1995 | Carter et al. | 707/8 |
| 5,442,782 A | 8/1995 | Malatesta et al. | |
| 5,628,005 A * | 5/1997 | Hurvig | 707/8 |
| 5,655,085 A | 8/1997 | Ryan et al. | |
| 5,694,598 A | 12/1997 | Durand et al. | |
| 5,703,938 A | 12/1997 | Lucas et al. | |
| 5,710,884 A | 1/1998 | Dedrick | |
| 5,758,031 A | 5/1998 | De Silva | |
| 5,859,972 A | 1/1999 | Subramaniam et al. | |

(Continued)

FOREIGN PATENT DOCUMENTS

| | | |
|---|---|---|
| CA | 2391829 | 6/2001 |
| DE | 10049940 A1 | 4/2002 |

(Continued)

OTHER PUBLICATIONS

Anonymous "Data Profiling the Foundation for Data Management" *DataFlux Corporation*, Jul. 1, 2004, pp. 1-17.

(Continued)

*Primary Examiner* — Thomas Dailey
(74) *Attorney, Agent, or Firm* — Schwegman Lundberg & Woessner, P.A.

(57) ABSTRACT

Methods and apparatus, including computer program products, for sharing information. The technique includes defining a stored data set maintained by a first entity to include a locked data set and an unlocked data set, and providing a second entity with access to the stored data set. The second entity has permission to view the locked data set and to change only the unlocked data set.

79 Claims, 6 Drawing Sheets

U.S. PATENT DOCUMENTS

| | | | |
|---|---|---|---|
| 5,911,139 | A | 6/1999 | Jain et al. |
| 5,966,715 | A * | 10/1999 | Sweeney et al. ............ 707/203 |
| 6,018,742 | A | 1/2000 | Herbert, III |
| 6,029,195 | A | 2/2000 | Herz |
| 6,032,147 | A | 2/2000 | Williams et al. |
| 6,067,525 | A | 5/2000 | Johnson et al. |
| 6,226,650 | B1 | 5/2001 | Mahajan et al. |
| 6,236,997 | B1 | 5/2001 | Bodamer et al. |
| 6,324,647 | B1 | 11/2001 | Bowman-Amuah |
| 6,330,598 | B1 | 12/2001 | Beckwith et al. |
| 6,405,132 | B1 | 6/2002 | Breed et al. |
| 6,480,755 | B1 | 11/2002 | Ootani et al. |
| 6,487,594 | B1 | 11/2002 | Bahlmann |
| 6,529,948 | B1 | 3/2003 | Bowman-Amuah |
| 6,567,818 | B1 | 5/2003 | Frey et al. |
| 6,711,456 | B2 | 3/2004 | Yokomori et al. |
| 6,718,361 | B1 | 4/2004 | Basani et al. |
| 6,738,682 | B1 | 5/2004 | Pasadyn |
| 6,754,666 | B1 | 6/2004 | Brookler et al. |
| 6,768,944 | B2 | 7/2004 | Breed et al. |
| 6,842,881 | B2 | 1/2005 | Croke et al. |
| 6,857,123 | B1 | 2/2005 | Nuxoll et al. |
| 6,895,408 | B1 | 5/2005 | Kavantzas |
| 6,915,287 | B1 | 7/2005 | Felsted et al. |
| 7,103,605 | B1 | 9/2006 | Hazi et al. |
| 2002/0065892 | A1 | 5/2002 | Malik |
| 2002/0073114 | A1 | 6/2002 | Nicastro et al. |
| 2002/0087510 | A1 | 7/2002 | Weinberg et al. |
| 2002/0095454 | A1 | 7/2002 | Reed et al. |
| 2002/0116417 | A1 | 8/2002 | Weinberg et al. |
| 2002/0124005 | A1 | 9/2002 | Matson et al. |
| 2002/0128904 | A1 | 9/2002 | Carruthers et al. |
| 2002/0156688 | A1 | 10/2002 | Horn et al. |
| 2002/0161778 | A1 | 10/2002 | Linstedt |
| 2002/0184308 | A1 | 12/2002 | Levy et al. |
| 2002/0194196 | A1 | 12/2002 | Weinberg et al. |
| 2003/0018878 | A1 | 1/2003 | Dorward et al. |
| 2003/0028519 | A1 | 2/2003 | Burgess |
| 2003/0135495 | A1 | 7/2003 | Vagnozzi |
| 2003/0191832 | A1 | 10/2003 | Satyavolu et al. |
| 2003/0233347 | A1 | 12/2003 | Weinberg et al. |
| 2004/0015408 | A1 | 1/2004 | Rauen, IV et al. |
| 2005/0038551 | A1 | 2/2005 | Mazumder et al. |
| 2006/0064456 | A1 | 3/2006 | Kalthoff et al. |

FOREIGN PATENT DOCUMENTS

| | | |
|---|---|---|
| WO | WO 01/37097 | 5/2001 |
| WO | WO 02/25471 | 3/2002 |
| WO | WO 02/25500 | 3/2002 |
| WO | WO 02/47463 | 6/2002 |
| WO | 03/093998 | 11/2003 |

OTHER PUBLICATIONS

Garcia et al. "Immunization Registries DeDuplication and Record Matching," *White Paper*, 1999, pp. 1-11.

Georgakopoulos et al. "An Overview of Workflow Management: From Process Modeling to Workflow Automation Infrastructure," *Distributed and Parallel Databases*, 1995, vol. 3, No. 2, pp. 119-153.

Rahm et al. "Data Cleaning: Problems and Current Approaches," *Quarterly Bulletin of the Computer Society of the IEEE Technical Committee on Data Engineering*, Dec. 2000, pp. 1-11.

Chan and Suwanda, "Designing Multinational Online Stores: Challenges, Implementation Techniques and Experience", *IBM Centre for Advanced Studies Conference: Proceedings of the 2000 conference of the Centre for Advanced Studies on Collaborative research*, Mississauga, Ontario, Canada, 2000, pp. 1-14.

Sheth and Larson, "Federated Database Systems for Managing Distributed, Heterogeneous, and Antonomous Databases", *ACM Computing Surveys*, 1990, 22(3): 184-236.

Bertino, Elisa, et al., "Data Security," Proceedings of the Twenty-Second Annual International Computer Software and Applications Conference, Vienna, Austria, Aug. 19-21, 1998, Los Alamitos, CA, USA, Aug. 19, 1998, (CompSAC '98), XP010305455, pp. 228-237.

Bon, M., et al., "Sharing Product Data Among Heterogeneous Workflow Environments," CAD 2002: Corporate Engineering Research, Geman Informatics Society, Mar. 4-5, 2002, Dresden, Germany, XP002268575, pp. 1-10.

Chandramouli, Ramaswamy, "Application of XML Tools for Enterprise-Wide RBAC Implementation Tasks," Proceedings of the 5th ACM Workshop on Role-Based Access Control, Berlin, Germany, Jul. 26-27, 2000, XP000958089, pp. 11-18.

Choi, Jin Oh, et al., "Update Propagation of Replicated Data in Distributed Spatial Databases," Proceedings of Database and Expert Systems Applications: Tenth International Conference, Florence, Italy, Aug. 30, 1999-Sep. 2, 1999, DEXA '99 (Lecture Notes in Computer Science vol. 1677), Berlin, Germany, Springer-Verlag, Germany, XP009022583, pp. 952-963.

Chou, H-T. et al., "Versions and Change Notification in an Object-Oriented Database System", Proceedings of the Design Automation Conference, Anaheim, Jun. 12-15, 1988, Proceedings of the Design Automation Conference (DAC), New York, IEEE, US, vol. Conf. 25, Jun. 12, 1988, pp. 275-281, XP010013006, ISBN: 0-8186-0864-1.

Ferreira Rezende, Fernando de, et al., "A Lock Method for KBMSs Using Abstraction Relationships' Semantics," Proceedings of the International Conference on Information and Knowledge Management, CIKM, ACM, New York, NY, USA, 1994, XP002943684, pp. 112-121.

Hong, B. et al., "Modeling of Version Relationships for CAD Databases", Computers and Communications Technology Toward 2000, Seoul, Aug. 25-28, 1987, Proceedings of the Region 10 Conference, (TENCON), New York, IEEE, US, vol. 1, Conf. 3, Aug. 25, 1987, pp. 142-146, XP000011783.

Kamita, T. et al., "A Database Architecture and Version Control for Group Work", System Sciences, 1994, vol. III: Information Systems: Decision Support and Knowledge-Based Systems, Proceedings of the Twenty-Seventh Hawaii International Conference on Wailea, HI, US, Jan. 4-7, 1994, Los Alamitos, CA, US, IEEE Comput. Soc., pp. 438-447, XP010097053, ISBN: 0-8186-5070-2.

Rana, S.P. et al., "Version Support for Manufacturing Database Systems", International Conference on Industrial & Engineering Applications of Artificial Intelligence & Expert Systems, Tullahoma, IN, US, New York, NY, US, vol. 2, Jun. 6, 1989, pp. 779-784, XP000605772.

Chaudhuri, Surajit, et al., "An Overview of Data Warehousing and OLAP Technology," SIGMOD Record, New York, NY, USA, vol. 26, No. 1, Mar. 1997, pp. 65-74, XP002193792, ISSN: 0163-5808.

Rahm, Erhard, et al., "Data Cleaning: Problems and Current Approaches," IEEE Bulletin of the Technical Committee on Data Engineering, vol. 23, No. 4, retrieved from the Internet Dec. 2000 at http://lips.informatik.uni-leipzig.de:80/pub/2000-45, XP002284896, 11 pgs.

"SyncML Protocol, version 1.0," Internet Citation, Dec. 7, 2000, XP002217356, 60 pgs.

Haerder T. et al., "Integritaetskontrolle," Datenbanken Konzepte und Techniken Der Implementierung, 1999, pp. 397-405, XP002294581 [translation provided].

U.S. Appl. No. 09/577,268, filed May 2000, Hazi et al.

U.S. Appl. No. 09/643,207, filed Aug. 2000, Brookler et al.

U.S. Appl. No. 09/643,316, filed Aug. 2000, Brookler et al.

Haerder T. et al., "RX-Sperrverfahren," Datenbanken Konzepte und Techniken Der Implementierung, 1999, pp. 419-420, XP002294552 [translation provided].

Berndtsson et al., Task Sharing Among Agents Using Reactive Rules, Cooperative Operation Systems, 1997. COOPIS '97., Proceedings of the Second IFCIS International, Jun. 24-27, 1997, pp. 56-65.

Hill et al., "Data Transformation: Key to Information Sharing" Gartner Group Strategic Analysis Report, Sep. 29, 1998, pp. 1-60.

* cited by examiner

COLLABORATIVE DESIGN PROCESS

CROSS-REFERENCE TO RELATED APPLICATIONS

This application is a continuation-in-part and claims priority based on U.S. patent application Ser. No. 10/306,718 for COLLABORATION PROCESS, filed Nov. 27, 2002, which claims priority to Provisional U.S. Patent Application No. 60/367,397 for MASTER DATA MANAGEMENT, filed Mar. 21, 2002, the disclosures of which are incorporated here by reference in their entirety.

BACKGROUND

The present invention relates to data processing, and more particularly, to sharing data.

An important factor in the success of businesses in the current era is the ability to flexibly react to the requirements of the market. Shorter product cycles require decreased product development times and quicker introduction to market, while increased customer demand for individual solutions increases the number of variants.

These factors require businesses to be able to proceed simultaneously with the definition of the product requirements and its structure as well as the introduction of collaborative processes during communication with subcontractors and development partners. New products must be introduced rapidly to market based on internally and externally defined requirements. In order to do this, different approaches must be considered, and input can be provided by different groups of people. Thus, the data used in the collaborative processes has to be monitored for consistency.

For example, one process that requires collaboration is the integration of engineering partners into product development. Different groups of people can change the available data while working on their part of the project. This can lead to logical corruption of data, where two different copies of the same data are edited simultaneously, or changes made to related data no longer match. This logical corruption can render the data unreliable.

SUMMARY

The present invention provides methods and apparatus, including computer program products, for sharing data in a product creation process.

In general, in one aspect, the invention features methods and apparatus for implementing a technique for sharing information. The technique includes defining a stored data set maintained by a first entity to include a locked data set and an unlocked data set and providing a second entity with access to the stored data set. The second entity has permission to view the locked data set and to change only the unlocked data set.

Particular implementations can include one or more of the following features. Providing a second entity with access to the stored data set can include providing an application in a computer system with access to the stored data set. The application can be maintained at a location external to the first entity. The application can include a computer aided design system. The application can include a testing application. The locked data set can include information to call the application while the unlocked data set can include data to be used by the application. Alternatively, the locked data set can include version data for the application and the unlocked data set can include raw data for the second entity to look at or use.

The first entity can also be provided with access to the stored data set. The first entity can have permission to view the unlocked data set and to change only the locked data set. The second entity can include a computer aided design system. The second entity can include a testing entity.

Providing the second entity with access to the stored data set can include sending the data to the second entity. The second entity can include an entity that is external to the first entity. Data in the stored data set can be assigned to the locked data set and the unlocked data set based on predetermined criteria. The stored data set can also include a restricted data set including data that is not part of the locked data set or the unlocked data set. Data can be assigned to the locked data set based on closeness criteria. Closeness criteria can include geometric closeness, organizational closeness, and collective closeness. Data in the stored data set can be assigned to the locked data set and the unlocked data set based on a function of the second entity.

The stored data set can be defined to include a locked data set and an unlocked data set for the second entity where data included in the unlocked data set for the second entity can be defined as being locked for other entities.

The technique can also include transmitting data from the stored data set to the second entity, receiving modified data from the second entity, and integrating the modified data corresponding to the unlocked data set into the stored data set. The stored data set can be defined to include a locked data set and an unlocked data set based on user input.

In another aspect, the invention features methods and apparatus for implementing a technique for sharing information. The technique includes defining a master data set in a first entity, assigning permissions to a subset of data within the master data set based on predetermined criteria, transmitting a copy of the master data set with indications of the permissions to a second entity, and receiving manipulated master data set in accordance with the assigned permissions. The assigned permissions can include permission to change data that is a subset of the transmitted copy of the master data.

Particular implementations can include one or more of the following features. The technique also can include receiving a modified copy of the master data set from the second entity and integrating the modified copy of the master data set with the master data set. The modified copy of the master data set can include additional data, test results and/or changed data. The changed data can include data that has been changed in response to testing.

The assigned permissions can include any combination of authority to read data, authority to change data, authority to add data and authority to delete data. The assigned permissions can also include authority to access predetermined types of data within the subset.

Assigning permissions can include assigning permissions based on at least one of an identity of an entity, a function of the entity and a user's position within the entity. Assigning permissions based on the user's position within the entity can include assigning permissions according to a hierarchy within the second entity so that a highest ranking member of an entity has a greater number of permissions, and a number and extent of permissions decrease as rank decreases. Assigning permissions can also include assigning different permissions for different subsets of the unlocked data.

In yet another aspect, the invention features methods and apparatus implementing a technique for sharing information. The technique can include receiving, in a second entity from a first entity, a copy of a master data set with permissions for using the master data set, modifying the copy of the master data set according to the permissions, and transmitting the modified copy of the master data set to the first entity. The master data set can include locked and unlocked data.

Particular implementations can include one or more of the following features. Receiving the copy of the master data set in a second entity can include receiving the copy of the master data set in a computer application. Receiving the copy of the master data set in a computer application can include receiving version information regarding the computer application in the locked data and receiving raw data for manipulation in the unlocked data.

Modifying the copy of the master data set can include performing design processes on the unlocked portion of the data. Modifying the copy of the master data set can include performing testing on the unlocked portion of the data.

Receiving the copy of the master data set with permissions for using the master data set can include receiving permissions to do at least one of read, change and add data to the unlocked data. Receiving the copy of the master data set with permissions for using the master data set can also include receiving the copy of the master data set with permissions based on subsets of the unlocked data, with different permissions assigned for different subsets of the unlocked data.

Receiving the copy of the master data set with permissions for using the master data set can further include receiving the copy of the master data set with permissions based on at least one of an identity of the second entity, a function of the second entity and a hierarchy of users within the second entity.

The invention can be implemented to realize one or more of the following advantages. An entity can share data with other entities while ensuring that the data is consistent and reliable. By defining a master data set to include a locked data set and an unlocked data set, an entity that maintains a master data set can protect data in the master data set that it shares with other users and/or applications. Locking data and maintaining a master data set also allows reduction of reconciliation processes and conserves the integrity of product data relationships. Since the master data tracks all changes, only an entity having the appropriate permissions can change the data. Thus, two versions of data can avoid having overlapping edits that need to be reconciled, and product relationships do not need to be reconciled.

Providing locked data with unlocked data, or data that an entity is permitted to edit, allows an entity to receive context information related to the data the entity is permitted to edit. Thus, an entity can see how modifications of the unlocked data will affect related data.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
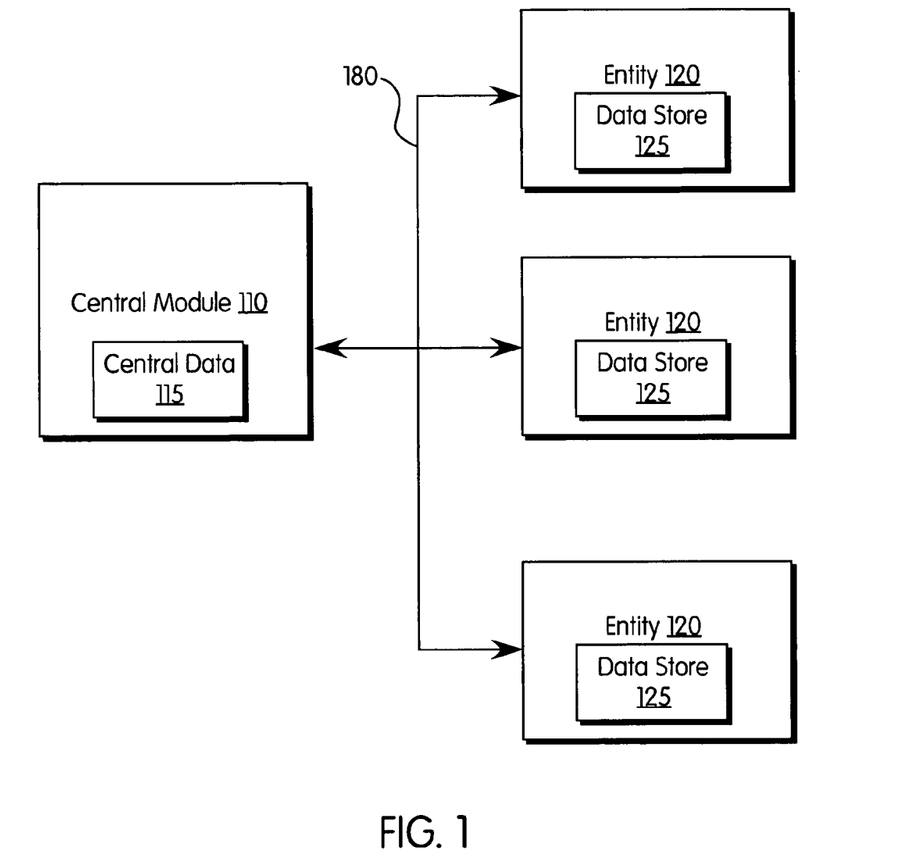
FIG. 1 is a block diagram illustrating a product creation system.

As shown in FIG. 1, a data sharing system can be implemented in a product creation system 100. The product creation system 100 includes a central module 110 and entity modules 120. Each of the modules 110, 120 includes a data store 115, 125. Although the following description is directed to a product creation system, the data sharing system 100 can be used with any system in which data is shared by two entities.

The central module 110 represents a centralized control for a product creation process. The entity modules 120 represent entities involved in the product creation process. The entities can include computer applications as well as companies, departments or individuals. Many different entities can participate in the development of a product. The entities can include internal and external entities. For example, entity modules 120 can include modules for design, testing, purchasing, marketing, sales, manufacturing, installation, customer service, technical services, customers, dealers, distributors, suppliers, vendors, and regulatory organizations. The central module 110 and the entity modules 120 can communicate through a network 180.

The central module 110 includes a central data store 115 that stores master data for a product creation process. The master data includes objects associated with the product creation process. These objects can include, for example, product classes, attributes, product line designs, parts lists, materials lists, quality specifications, requirements, routing and process structures.

The central data can be accessed by the entity modules 120, based on permissions, or transmitted to the entity modules 120 through network 180. Each of the entity modules 120 includes a data store 125 for storing the data received from the central module 110 and for additional entity specific data developed in entity module 120. For example, if the entity module 120 is a marketing module, the corresponding data store 125 could store marketing specific information.

The entity modules 120 can develop objects of the product creation process in parallel. Each entity module 120 can develop different versions of each object of the product creation process. For example, classes of a product can include types, models, body styles, sizes, etc. Attributes can include information about component parts such as engine type (e.g., 95 HP, 110 HP, 125 HP, etc.) or brake type (e.g., disc or drum), or characteristics such as body color (e.g., black, silver, red, etc.) or fuel efficiency (e.g., 30 m.p.g.).

Figure 2:
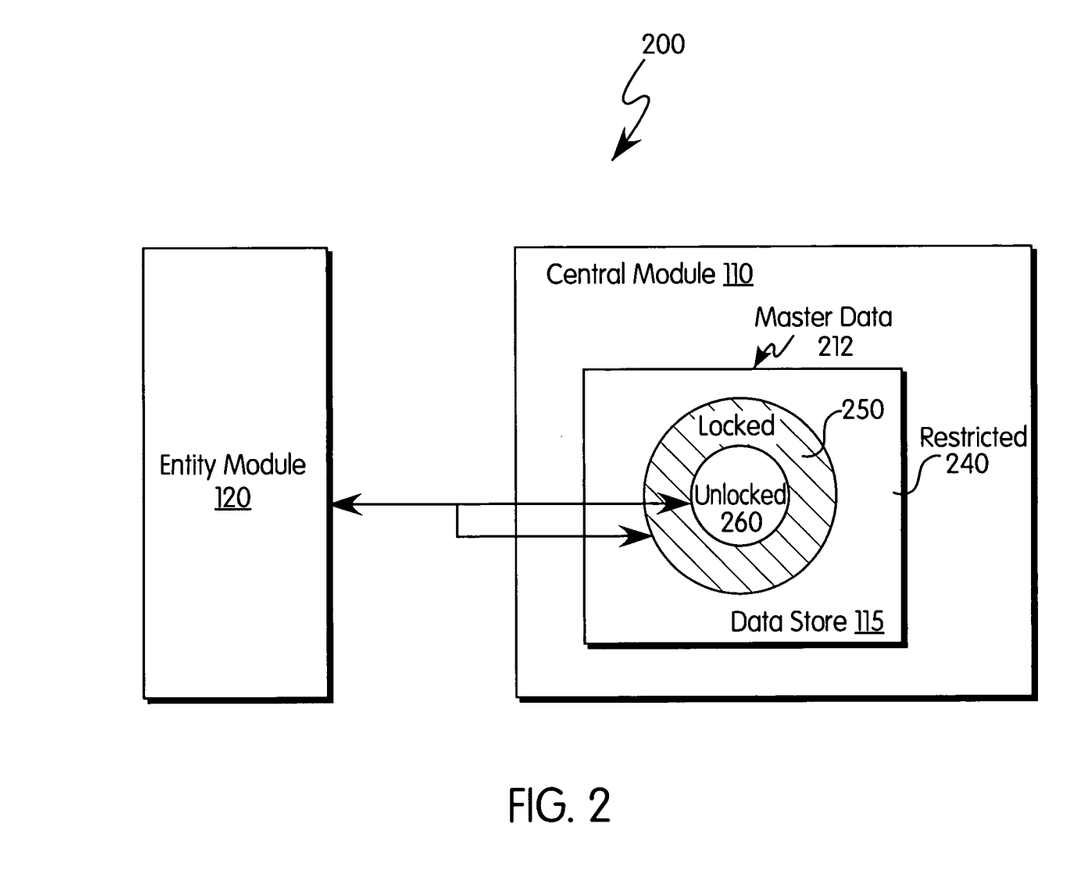
FIG. 2 is a block diagram illustrating a data sharing system.

FIG. 2 is a block diagram illustrating a data sharing system 200. The data sharing system 200 includes a set of master data 212 stored in a first entity data store, such as central data store 115. The first entity can include central module 110. The master data 212 can be shared with a second entity 120 by allowing access to the second entity, such as an entity module 120. The data sharing system 200 allows master data 212 to include a locked data set 250 and an unlocked data set 260. Data within the master data 212 can be assigned to the locked data set 250 and unlocked data 260 by the first entity or users associated with the first entity.

The master data 212 can also include a set of restricted data 240. The restricted data 240 can be assigned by the first entity. The restricted data includes all data that is not included in the locked data set 250 or the unlocked data set 260. The restricted data set 240 can include data that is not relevant to the second entity 120 or confidential data to which the second entity 120 is not given access.

Unlocked data set 260 can include data that is to be manipulated by the second entity. When a specified entity is assigned a specified unlocked data set 260, the specified unlocked data set 260 in the first entity can be configured so that other entities will not be able to change the data in the specified unlocked data set 260. For example, the data in the specified unlocked data set 260 assigned to the specified entity can be designated as locked in the first entity, and can be assigned to other entities as locked data 250. If the specified entity updates data in the specified unlocked data set 260, the corresponding data that was assigned to other entities as locked data 250 will also be updated. The update to locked data 250 in other entities can be performed immediately through a standing link.

The locked data set 250 can include information that the second entity has access to but does not have permission to change. For example, if the second entity can be a computer aided design ("CAD") system. A CAD system can be used by a designer to view graphic representations of a design, based on design data, from various angles and at various zoom distances. Thus, if the second entity is a CAD system, the unlocked data set 260 can include design related data while the locked data set 250 can include information that the first entity uses to call the testing CAD system. The CAD system can access the unlocked data set 260 and manipulate the data, such as by creating graphic representations of a design using the data and updating the data in the unlocked data set 260, for example, if a user makes changes in the design.

As another example, if the second entity is a testing application, the unlocked data set 220 can include testing data while the locked data set 230 can include information that the first entity uses to call the testing application. The testing application can access the unlocked data set 230 and manipulate the data, such as by performing tests based on the available data and updating the testing results in the unlocked data set 230.

The unlocked data set 260 can include a variety of permissions for manipulation. The permissions can include permissions to read the data, add new data within the unlocked data set 260 (e.g., add a new category of data), and permission to change or delete existing data in the unlocked data set. The unlocked data set can be divided into smaller subsets where the permissions vary from set to set. For example, the entity can read one subset, change data in another subset, and add and change data in a third subset.

The permissions can be assigned to the second entity according to a hierarchy. For example, if the second entity is an entity including a plurality of employees, the permissions can be assigned according to position within the entity so that a highest ranking member of the entity has a greater number of permissions, and a number and extent of permissions decrease as rank decrease. For example, the director of a group could have permission to read, add and change data in all subsets of the unlocked data set, while supervisors for departments within the group can have permission to read, add and change subsets of data that apply to their departments only. Lower level employees can be given permission to only read data within the subset of the unlocked data that applies to their departments. In addition to permissions, locked data could include identifiers for versions of applications or even applications to use in manipulating the data (the unlocked data).

The permissions can also be used to divide the master data set 212 into the locked data set 250, unlocked data set 260 and the restricted data set 240. For example, data that is made available to the second entity 120 with an assigned a permission of read only can be part of the locked data set 250. Data that is assigned a permission allowing the second entity 120 to change the data can be part of the unlocked data set 260.

Data can be separated between the locked data set 250 and the restricted data set 240 based on closeness criteria. Closeness criteria can include geometrical closeness, organizational closeness, and/or collective closeness. An algorithm for including data in the locked data set 250 that is based on geometrical closeness can cause the locked data set 250 to include data about items that are geometrically (e.g., physically) close to the subject of the unlocked data set 260. For example, if the unlocked data set 260 includes data regarding design of headlights of a car, the locked data set 250 can include information regarding the headlight support on the body of the car. Because the headlight support is physically close to the headlight, and the headlight support can affect headlight design. Information regarding the car's rear wheel can be left in the restricted data set 240 because the rear wheel is not close to the headlight.

An algorithm based on organizational closeness can cause the locked data set to include data regarding items that are a part of the same organizational structure as the subject of the unlocked data set 260. For example, if the unlocked data set 260 includes data about the motor of a car, the locked data set 250 can include information regarding the rear axle of the car. Although the motor and the rear axle may not be geometrically close, they are part of the same organizational structure.

An algorithm based on collective closeness can cause the locked data set 250 to include data regarding items that are a part of the same data collection as the subject of the unlocked data set 260. Thus, if the unlocked data set 260 includes data regarding a car's headlights, the locked data set can include information regarding the car's battery. Although the battery is not geometrically close to the headlights, or part of the same organizational structure, the headlight and battery can be part of the same data collection. Thus, collective closeness can be used to override exclusions based on geometric or organizational closeness criteria.

Inclusion of data in the locked data set 250 can be limited by permissions, as discussed above. If data that can be included in the locked data set 250 based on the closeness criteria is considered too confidential to be shared with a second entity 120, the confidential data is excluded from the locked data set 250 and remains in the restricted data set 240.

Figure 3:
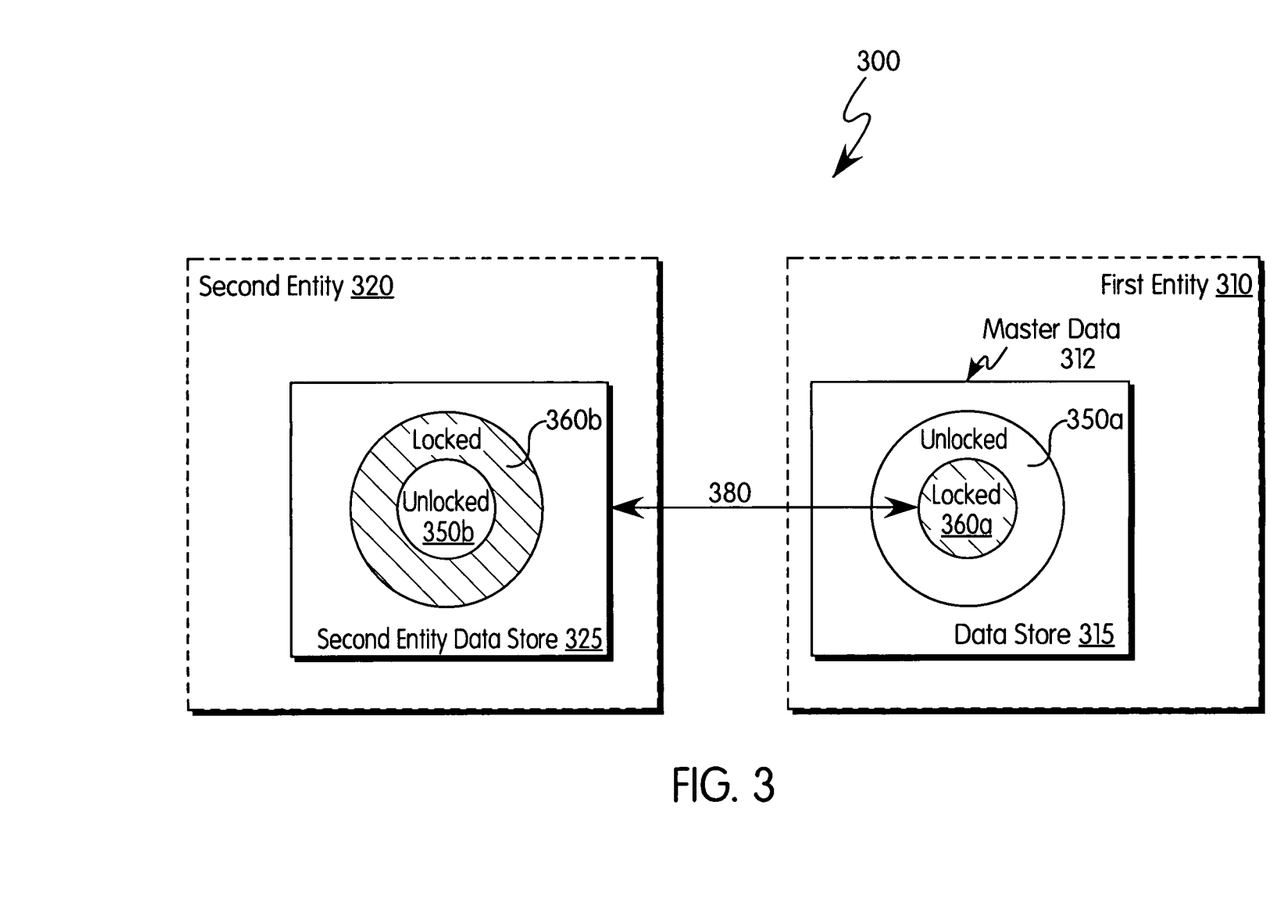
FIG. 3 is a block diagram illustrating an alternative data sharing system.

FIG. 3 is a block diagram illustrating an alternative data sharing system 300. The first entity data store 315 includes locked data 350*a* and unlocked data 360*a*. The first entity 310 can use or change unlocked data 360*a*, but can only view the locked data 350*a*. The first entity 310 can transmit a copy of the master data 212 to the second entity 320.

The second entity 320 receives a copy of the master data 212 from the first entity 310 over network 380. The second entity 320 stores the received copy in a data store 325. When the copy of the master data set 312 is transmitted to the second entity 320, the locked and unlocked data become reversed in the second entity data store 325. The locked data set 350*a* in the first entity 310 becomes the unlocked data set 360*b* in the second entity 320, while the unlocked data set 360*a* in the first entity 310 becomes the locked data set 350*b* in the second entity 320.

The second entity 320 can manipulate and modify the copy of the master data 212 in its data store 325 in accordance with permissions attached to the data. The second entity 320 transmits the modified copy of the master data 312 to the first entity 310. The first entity 310 can integrate the modified copy of the master data 312 with the copy of the master data 312 stored in data store 315 according to the permissions assigned. For example, if the modified copy of the master data 312 includes changes or new data from sources that did not have permission to manipulate the data, those modifications are not included in the master data 312 stored in data store 315.

Figure 4:
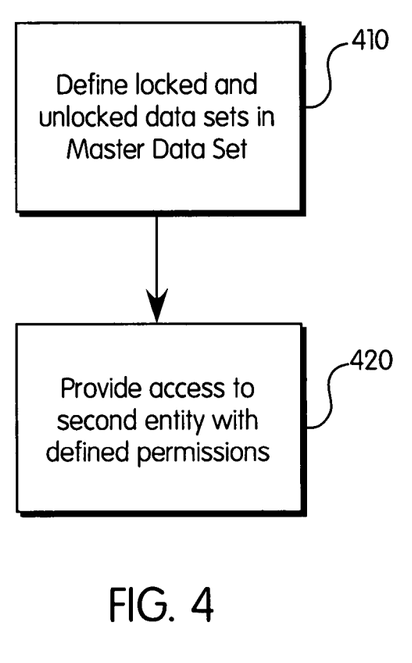
FIG. 4 is a flow diagram illustrating a method of sharing data.

FIG. 4 is a flow diagram illustrating a method of sharing data. The method includes defining a locked data set 250 and an unlocked data set 260 in a master data set 212. (step 410) Defining the locked data set 250 and unlocked data set 260 can include defining the locked data set 250 and unlocked data set 260 based on permissions, as described above. Thus, data that is in the locked data set 250 for one entity 120 can be in the unlocked data set 260 for another entity 120.

The locked set of data 250 and the unlocked set of data 260 can also be divided based on the function of the entity 120 receiving the data. For example, if the entity 120 receiving the data is the marketing department, the unlocked set of data 260 can include marketing related information, such as marketing statistics or sales projections.

When the locked set of data 250 and the unlocked set of data 260 have been defined, a first entity 110 can provide a second entity 120 with access to the master data set 212 based on the permissions assigned to the second entity 120. (step 420) The second entity 120 can include, for example, an organization, an individual, a computer application, or any other entity capable of using data. The second entity 120 can manipulate the unlocked data set 260 according to the permissions assigned to it.

If the second entity 120 includes a computer application, the locked data set 250 can include information to call the application while the unlocked data set 260 includes data to be used by the application. For example, the locked data set 250 can include version data of the application called while the unlocked data set 260 includes raw data for the application to look at or use in its execution.

Figure 5:
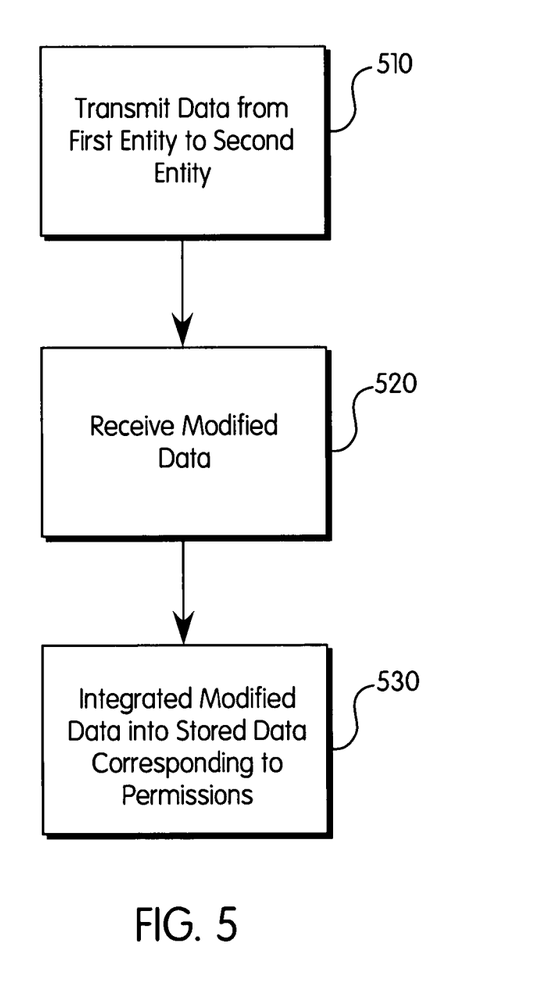
FIG. 5 is a flow diagram illustrating an alternative method of sharing data.

FIG. 5 is a flow diagram of another implementation of a method of sharing master data 212. The method can include transmitting the set of master data 212 from a first entity 110, such as central module 110, to a second entity 120, such as entity module 120. (Step 510) The master data 212 can be defined as described above with reference to FIG. 4.

The method further includes receiving a modified copy of the master data from the second entity 120. (Step 520) The modified copy of the master data can include additions or changes to the master data 212 performed by the second entity 120 according to permissions assigned to the second entity 120. When the modified copy of the master data is returned from the second entity 120 to the first entity 110, the locked and unlocked designations are returned to the first entity 110. Thus, data that was locked in the first entity 110, because it was available to the second entity 120 as unlocked data, can now be designated as unlocked in the first entity 110.

The first entity 110 integrates the modified copy of the master data into the master data set 212 stored in central data store 115, according to the permissions assigned to the second entity 120. (Step 530) For example, the first entity 110 can replace data in the unlocked data set 260 with modifications made in the unlocked data set 260 by the second entity 120. The first entity 110 can further check the source of each modification to determine if the source of the change in the second entity 120 had permission to modify the data. Then, the first entity 110 can modify the data in the unlocked data set 260 in central data store 115 only if the source had permission.

Figure 6:
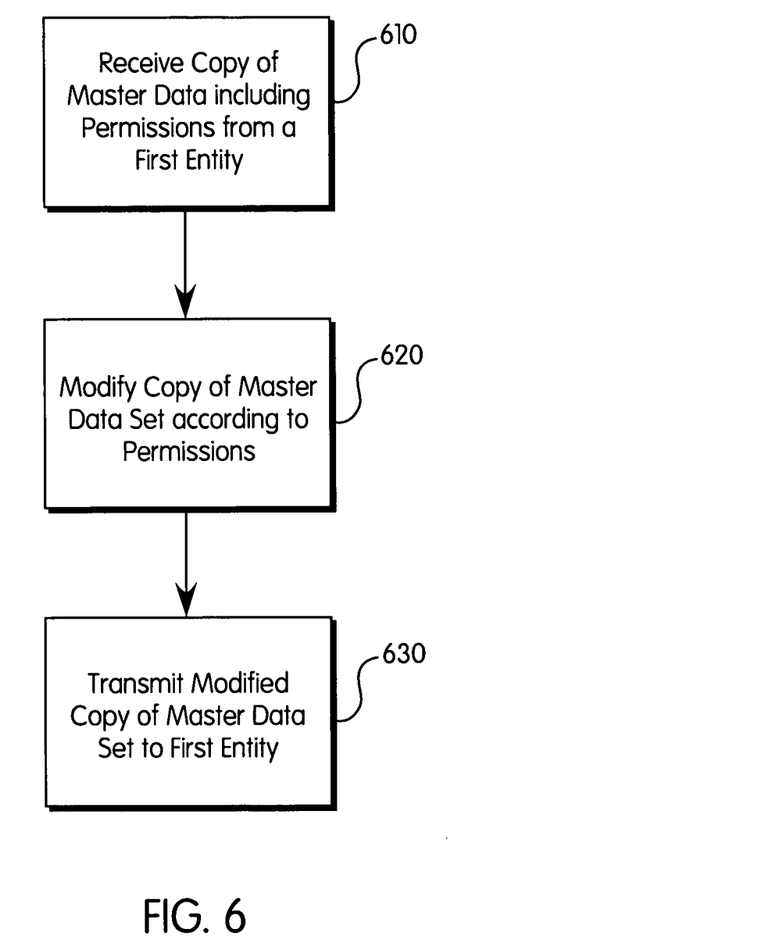
FIG. 6 is a flow diagram illustrating an implementation of a method of using shared data.

FIG. 6 is a flow diagram illustrating an implementation of a method of using shared master data 212 by the second entity 120. The method of using the shared master data 212 can include receiving a copy of the master data set 212 with permissions. (Step 610) The shared master data 212 is received in the second entity 120 from the first entity 110.

The second entity 120 can modify the copy of the master data set 212 according to the permissions received with the copy of the master data set 212. (Step 620) For example, if the second entity 120 is a CAD system, the second entity 120 can create graphic representations for a designer to view using the unlocked data set 260, and allow update of the design data. As another example, if the second entity is a testing application, the second entity can perform tests using the unlocked data and can update testing data.

After the second entity 120 is finished manipulating the copy of the master data set 212, the second entity 120 transmits the modified copy of the master data set to the first entity 110 (Step 630). The first entity 110 integrates the modified copy with the master data set in central data store 115, as described with reference to FIG. 5.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer-implemented method comprising;
defining a stored data set maintained by a first entity of a computer system to include a locked data set and an unlocked data set, the stored data set being stored in memory, the unlocked data set being available for modification and the locked data set being protected from modification;
transmitting the locked data set and the unlocked data set to a second entity; and
reversing the locked data set and the unlocked data set at the second entity, such that the locked data set becomes an unlocked data set being available for modification and the unlocked data set becomes a locked data set being protected from modification.

2. The method of claim 1, wherein the defining of the stored data set maintained by the first entity to include the locked data set and the unlocked data set includes defining the locked data set to include information to call an application and the unlocked data set to include data to be used by the application.

3. The method of claim 1, wherein the defining of the stored data set maintained by the first entity to include the locked data set and the unlocked set includes defining version data for an application as the locked data set and defining raw data for the second entity to look at or use as the unlocked data.

4. The method of claim 1, wherein defining the stored data set to include the locked data set and the unlocked data set further includes defining the stored data set to include a restricted data set including data that is not part of the locked data set or the unlocked data set.

5. The method of claim 1, wherein defining the stored data set to include the locked data set and the unlocked data set further includes assigning data to the locked data set based on closeness criteria.

6. The method of claim 5, wherein assigning data to the locked data set based on closeness criteria includes assigning data to the locked data set based on at least one of geometric closeness, organizational closeness, and collective closeness.

7. The method of claim 1, wherein defining the stored data set to include the locked data set and the unlocked data set includes assigning data in the stored data set to the locked data set and the unlocked data set based on a function of the second entity.

8. The method of claim 1, wherein defining the stored data set to include a locked data set and an unlocked data set includes defining the stored data set to include a locked data set and an unlocked data set for the second entity, the method further comprising:
defining data included in the unlocked data set for the second entity as locked for other entities.

9. The method of claim 8, wherein defining data included in the unlocked data set for the second entity as locked for other entities includes defining data included in the unlocked data set for the second entity as locked for all other entities during a period of time when the second entity has access to the unlocked data set.

10. The method of claim 1, further comprising:
receiving modified data from the second entity; and
integrating the modified data into the stored data set.

11. The method of claim 1, wherein defining the stored data set to include the locked data set and the unlocked data set includes defining the stored data set to include a locked data set and an unlocked data set based on user input.

12. A computer-implemented method of sharing information, comprising:
defining a master data set in a first entity of a computer system, the master data set being stored in memory;
assigning permissions, including permission to change a first subset of data within the master data set based on predetermined criteria, the permissions indicating operations that a second entity may perform on the first subset data and applications that the second entity may use for manipulating the first subset of data;
transmitting a copy of the master data set with indications of the permissions to the second entity, the transmitted copy of the master data set including locked and unlocked data, the locked data in the received copy of the master data set corresponding to unlocked data in the master data set in the first entity and the unlocked data in the received copy of the master data set corresponding to locked data in the master data set in the first entity; and
receiving a manipulated master data set in accordance with the assigned permissions from the second entity, the manipulated master data set including a second subset of data resulting from the first subset of data being manipulated by the second entity using one or more of the operations indicated in the permissions.

13. The method of claim 12, further comprising receiving a modified copy of the master data set from the second entity and integrating the modified copy of the master data set with the master data set.

14. The method of claim 13, wherein receiving the modified copy of the master data set includes receiving additional data.

15. The method of claim 13, wherein receiving the modified copy of the master data set includes receiving changed data.

16. The method of claim 15, wherein receiving changed data includes receiving data that has been changed in response to design considerations.

17. The method of claim 12, wherein assigning permissions includes assigning authority to read data.

18. The method of claim 12, wherein assigning permissions includes assigning authority to change data that is a subset of the transmitted copy of the master data.

19. The method of claim 12, wherein assigning permissions includes assigning authority to add data.

20. The method of claim 12, wherein assigning permissions includes assigning authority to delete data.

21. The method of claim 12, wherein assigning permissions includes assigning authority to access predetermined types of data within the subset.

22. The method of claim 12, wherein assigning permissions includes assigning permissions based on at least one of an identity of an entity, a function of the entity and a user's position within the entity.

23. The method of claim 22, wherein assigning permissions based on the user's position within the entity includes assigning permissions according to a hierarchy within the second entity so that a highest ranking member of an entity has a greater number of permissions, and a number and extent of permissions decrease as rank decreases.

24. The method of claim 12, wherein assigning permissions includes assigning different permissions for different subsets of the unlocked data.

25. A computer-implemented method of sharing information, comprising:
receiving, from a first entity of a computer system, a copy of a master data set, the master data set including locked and unlocked data and being stored in memory, the received copy of the master data set including locked and unlocked data, the locked data in the received copy of the master data set corresponding to the unlocked data in the master data set and the unlocked data in the received copy of the master data set corresponding to the locked data in the master data set;
modifying the copy of the master data set; and
transmitting the modified copy of the master data set to the first entity.

26. The method of claim 25, wherein receiving the copy of the master data set in a second entity includes receiving the copy of the master data set in a computer application.

27. The method of claim 26, wherein receiving the copy of the master data set in a computer application includes receiving version information regarding the computer application in the locked data and receiving raw data for manipulation in the unlocked data.

28. The method of claim 25, wherein modifying the copy of the master data set includes performing design processes on the unlocked portion of the data.

29. The method of claim 25, wherein receiving the copy of the master data set includes receiving permissions to do at least one of read, change, delete and add data to the unlocked data.

30. The method of claim 25, wherein receiving the copy of the master data set includes receiving the copy of the master data set with permissions based on subsets of the unlocked data, with different permissions assigned for different subsets of the unlocked data.

31. The method of claim 25, wherein receiving the copy of the master data set includes receiving the copy of the master data set with permissions based on at least one of an identity of the second entity, a function of the second entity and a hierarchy of users within the second entity.

32. A computer program product, tangibly stored on one or more computer-readable storage devices, the computer program product comprising instructions operable to cause a programmable processor to:
define a stored data set maintained by a first entity to include a locked data set and an unlocked data set, the unlocked data set being available for modification and the locked data set being protected from modification
transmit the locked data set and the unlocked data set to a second entity; and
reverse the locked data set and the unlocked data set at the second entity, such that the locked data set becomes an unlocked data set being available for modification and the unlocked data set becomes a locked data set being protected from modification.

33. The computer program product of claim 32, wherein the instructions include instructions operable to cause the programmable processor to provide an application in a computer system with access to the stored data set.

34. The computer program product of claim 33, wherein the instructions include instructions operable to cause the programmable processor to provide an application maintained at a location external to the first entity with access to the stored data set.

35. The computer program product of claim 33, wherein the instructions include instructions operable to cause the programmable processor to provide a computer aided design system with access to the stored data set.

36. The computer program product of claim 33, wherein the instructions include instructions operable to cause the programmable processor to define the locked data set to include information to call an application and to define the unlocked data set to include data to be used by the application.

37. The computer program product of claim 33, wherein the instructions include instructions operable to cause the programmable processor to define as the locked data set version data for the application and to define as the unlocked data set raw data for the second entity to look at or use.

38. The computer program product of claim 32, wherein the instructions include instructions operable to cause the programmable processor to send the stored data set to the second entity.

39. The computer program product of claim 32, further comprising instructions operable to cause the programmable processor to provide the first entity with access to the stored data set, the first entity having permission to view the unlocked data set and to change only the locked data set.

40. The computer program product of claim 32, wherein the instructions include instructions operable to cause the programmable processor to provide a computer aided design system with access to the stored data set.

41. The computer program product of claim 32, wherein the instructions include instructions operable to cause the programmable processor to provide an entity that is external to the first entity with access to the stored data set.

42. The computer program product of claim 32, wherein the instructions include instructions operable to cause the programmable processor to assign, based on predetermined criteria, data in the stored data set to a locked data set and an unlocked data set.

43. The computer program product of claim 32, wherein the instructions include instructions operable to cause the programmable processor to include a restricted data set including data that is not part of the locked data set or the unlocked data set.

44. The computer program product of claim 32, wherein the instructions include instructions operable to cause the programmable processor to assign data to the locked data set based on a closeness criteria.

45. The computer program product of claim 44, wherein the instructions include instructions operable to cause the programmable processor to assign data to the locked data set based on at least one of geometric closeness, organizational closeness, and collective closeness.

46. The computer program product of claim 32, wherein the instructions include instructions operable to cause the programmable processor to assign data in the stored data set to the locked data set and the unlocked data set based on a function of the second entity.

47. The computer program product of claim 32, wherein the instructions include instructions operable to cause the programmable processor to define the stored data set to include the locked data set and the unlocked data set for the second entity, the computer program product further comprising instructions operable to cause the programmable processor to:
define data included in the unlocked data set for the second entity as locked for all other entities.

48. The computer program product of claim 47, wherein the instructions operable to cause the programmable processor to define data included in the unlocked data set for the second entity as locked for all other entities include instructions operable to cause the programmable processor to define data included in the unlocked data set for the second entity as locked for other entities during a period of time when the second entity has access to the unlocked data set.

49. The computer program product of claim 32, further comprising instructions operable to cause the programmable processor to:
transmit data from the stored data set to the second entity;
receive modified data from the second entity; and
integrate the modified data corresponding to the unlocked data set into the stored data set.

50. The computer program product of claim 32, wherein the instructions include instructions operable to cause the programmable processor to define, based on user input, the stored data set to include the locked data set and the unlocked data set.

51. A computer program product, tangibly stored on one or more computer-readable storage devices, the computer program product comprising instructions operable to cause a programmable processor to:
define a master data set in a first entity;
assign permissions, including permission to change data within the master data set based on predetermined criteria;
transmit a copy of the master data set with indications of the permissions to the second entity, the transmitted copy of the master data set including locked and unlocked data, the locked data in the transmitted copy of the master data set corresponding to unlocked data in the master data set in the first entity and the unlocked data in the transmitted copy of the master data set corresponding to locked data in the master data set in the first entity; and
receive changes to the master data set from the second entity.

52. The computer program product of claim 51, further comprising instructions operable to cause the programmable processor to receive a modified copy of the master data set from the second entity and to integrate the modified copy of the master data set with the master data set.

53. The computer program product of claim 52, wherein the instructions operable to cause the programmable processor to receive the modified copy of the master data set include instructions operable to cause a programmable processor to receive additional data.

54. The computer program product of claim 52, wherein the instructions operable to cause the programmable processor to receive the modified copy of the master data set include instructions operable to cause a programmable processor to receive changed data.

55. The computer program product of claim 54, wherein the instructions operable to cause the programmable processor to receive changed data include instructions operable to cause a programmable processor to receive data that has been changed in response to design considerations.

56. The computer program product of claim 51, wherein the instructions operable to cause the programmable processor to assign permissions include instructions operable to cause a programmable processor to assign authority to read data.

57. The computer program product of claim 51, wherein the instructions operable to cause the programmable processor to assign permissions include instructions operable to cause a programmable processor to assign authority to change data that is a subset of the transmitted copy of the master data.

58. The computer program product of claim 51, wherein the instructions operable to cause the programmable processor to assign permissions include instructions operable to cause a programmable processor to assign authority to add data.

59. The computer program product of claim 51, wherein the instructions operable to cause the programmable processor to assign permissions include instructions operable to cause a programmable processor to assign authority to delete data.

60. The computer program product of claim 51, wherein the instructions operable to cause the programmable processor to assign permissions include instructions operable to cause a programmable processor to assign authority to access predetermined types of data within the subset.

61. The computer program product of claim 51, wherein the instructions operable to cause the programmable processor to assign permissions include instructions operable to cause a programmable processor to assign permissions based on at least one of an identity of an entity, a function of the entity and a user's position within the entity.

62. The computer program product of claim 61, wherein the instructions operable to cause the programmable processor to assign permissions based on a user's position within the entity include instructions operable to cause a programmable processor to assign permissions according to a hierarchy within a department so that a highest ranking member of a department has a greater number of permissions, and a number and extent of permissions decrease as rank decreases.

63. A computer program product, tangibly stored on one or more computer-readable storage devices, the computer program product comprising instructions operable to cause a programmable processor to:
receive, from a first entity, a copy of a master data set with permissions for using the master data set, the master data set including locked and unlocked data, the first permissions allowing changes to the unlocked data and access but no changes to the locked data, the permissions indicating operations that may be performed on the unlocked data and the locked data and applications that the second entity may use for manipulating the unlocked data, the received copy of the master data set including locked and unlocked data, the locked data in the received copy of the master data set corresponding to unlocked data in the master data set in the first entity and the unlocked data in the received copy of the master data set corresponding to the locked data in the master data set in the first entity;

modify the copy of the master data set according to the permissions and user input to generate a modified copy of the master data set, wherein modifying includes applying one or more of the operations indicated in the permissions to the unlocked data; and transmit the modified copy of the master data set to the first entity.

64. The computer program product of claim 63, wherein the instructions include instructions operable to cause the programmable processor include instructions operable to cause the programmable processor to receive the copy of the master data set in a computer application.

65. The computer program product of claim 64, wherein the instructions include instructions operable to cause the programmable processor to receive, in the locked data, version information regarding the computer application and to receive, in the unlocked data, raw data for manipulation.

66. The computer program product of claim 64, wherein the instructions operable to cause the programmable processor to modify the copy of the master data set include instructions operable to cause the programmable processor to perform design processes on the unlocked portion of the data.

67. The computer program product of claim 66, wherein the instructions operable to cause the programmable processor to receive the copy of the master data set with permissions for using the master data set include instructions operable to cause the programmable processor to receive permissions to do at least one of read, change, delete and add data to the unlocked data.

68. The computer program product of claim 63, wherein the instructions operable to cause the programmable processor to receive the copy of the master data set with permissions for using the master data set include instructions operable to cause the programmable processor to receive the copy of the master data set with permissions based on subsets of the unlocked data, with different permissions assigned for different subsets of the unlocked data.

69. The computer program product of claim 63, wherein the instructions operable to cause the programmable processor to receive the copy of the master data set with permissions for using the master data set include instructions operable to cause the programmable processor to receive the copy of the master data set with permissions based on at least one of an identity of the second entity, a function of the second entity and a hierarchy of users within the second entity.

70. The method of claim 1 including providing a testing application with access to the stored data set.

71. The method of claim 1, including providing a testing entity with access to the stored data set.

72. The method of claim 14, wherein receiving additional data includes receiving test results.

73. The method of claim 15, wherein receiving changed data includes receiving data that has been changed in response to testing.

74. The method of claim 25, wherein modifying the copy of the master data set includes performing testing on the unlocked portion of the data.

75. The computer program product of claim 33, wherein the instructions operable to cause the programmable processor to provide the application in the computer system with access to the stored data set includes the instructions operable to cause the programmable processor to provide a testing application with access to the stored data set.

76. The computer program product of claim 32, wherein the instructions operable to cause the programmable processor to provide the second entity with access to the stored data set includes the instructions operable to cause the programmable processor to provide a testing entity with access to the stored data set.

77. The computer program product of claim 53, wherein the instructions operable to cause the programmable processor to receive the additional data include instructions operable to cause the programmable processor to receive test results.

78. The computer program product of claim 54, wherein the instructions operable to cause the programmable processor to receive the changed data include instructions operable to cause the programmable processor to receive data that has been changed in response to testing.

79. The computer program product of claim 64, wherein the instructions operable to cause the programmable processor to modify the copy of the master data set include instructions operable to cause the programmable processor to perform testing on the unlocked portion of the data.

* * * * *